US006768722B1

(12) United States Patent
Katseff et al.

(10) Patent No.: US 6,768,722 B1
(45) Date of Patent: Jul. 27, 2004

(54) SYSTEMS AND METHODS FOR MANAGING MULTIPLE COMMUNICATIONS

(75) Inventors: Howard Paul Katseff, Marlboro, NJ (US); Robert Edward Markowitz, Glen Rock, NJ (US); Bethany Scott Robinson, Lebanon, NJ (US)

(73) Assignee: AT&T Corp., New York, NY (US)

( * ) Notice: Subject to any disclaimer, the term of this patent is extended or adjusted under 35 U.S.C. 154(b) by 777 days.

(21) Appl. No.: 09/603,667

(22) Filed: Jun. 23, 2000

(51) Int. Cl.[7] .............................................. H04L 12/16
(52) U.S. Cl. ................... 370/260; 379/207.01
(58) Field of Search ................................ 370/259, 214, 370/310, 356, 352, 260, 261; 379/163, 162, 142, 393, 207, 93, 67, 201, 214, 215, 212, 202.01, 204.01

(56) References Cited

U.S. PATENT DOCUMENTS

| | | | |
|---|---|---|---|
| 4,628,153 A | 12/1986 | Daly ........................... | 379/163 |
| 5,195,087 A | 3/1993 | Bennett et al. ............... | 370/62 |
| 5,696,815 A | 12/1997 | Smyk ........................... | 379/142 |
| 5,742,596 A | 4/1998 | Baratz et al. ............... | 370/356 |
| 5,805,587 A | 9/1998 | Norris et al. ............... | 370/352 |
| 5,805,677 A | 9/1998 | Ferry et al. ................. | 379/93.35 |
| 5,805,682 A | 9/1998 | Voit et al. .................... | 379/142 |
| 5,825,862 A | 10/1998 | Voit et al. .................... | 379/142 |
| 5,875,231 A | 2/1999 | Farfan et al. ................. | 379/67 |
| 5,883,945 A | 3/1999 | Richardson et al. ......... | 379/189 |
| 5,907,604 A | 5/1999 | Hsu ............................. | 379/142 |
| 5,946,384 A | 8/1999 | Yee et al. .................... | 379/215 |
| 6,014,687 A | 1/2000 | Watanabe et al. ........... | 709/204 |
| 6,118,861 A * | 9/2000 | Gutzmann et al. ..... | 379/201.01 |
| 6,122,346 A * | 9/2000 | Grossman ..................... | 379/68 |
| 6,219,415 B1 * | 4/2001 | Deutsch et al. ......... | 379/215.01 |
| 6,400,804 B1 * | 6/2002 | Bilder .......................... | 379/76 |

* cited by examiner

Primary Examiner—Chi Pham
Assistant Examiner—Daniel K. Lam

(57) ABSTRACT

The present invention enables a party which is placed on hold in a first communication session to enter a second communication session and continue to monitor the status of the first communication. For example, in a broadband communication system telephone call or multimedia call, two parties may be in an active communication session with one another and a first of the two parties to the call may receive another incoming call. The first party then places the second party on hold. At this time the second party may wish to place the communication session with the first party on hold to initiate another communication session with a third party. However, the second party would also like to know when the first party takes the communication session off hold so that they can resume their communication. As a result, the second party places the communication on "monitor" hold. While the communication is on monitor hold, the second party is able to monitor the on hold communication session to recognize when the first party returns. For example, the monitored call on hold may be maintained at a reduced volume or a video display of the video in a multimedia communication session may be displayed in a reduced window size on a display. Further, the present invention provides prompts to various parties of a communication session when one or more parties to the communication session are placed on hold or taken off hold. For example, the system may generate a prompt to one or more parties when a communication session is placed on hold or monitor hold, or when a communication session on hold or monitor hold is taken off hold.

14 Claims, 6 Drawing Sheets

200

SYSTEMS AND METHODS FOR MANAGING MULTIPLE COMMUNICATIONS

TECHNICAL FIELD

The present invention relates to improved communication systems and, more particularly, to managing multiple communications with a user communication device.

BACKGROUND OF THE INVENTION

Traditional telephone systems, such as a public switched telephone networks (PSTN), have telephone switching systems which provide numerous services beyond plain old telephone service (POTS). These features include, for example, call hold, call waiting, caller ID, three-way calling, etc. However, a number of features are not yet available for PSTN telephony and the PSTN is limited in bandwidth.

Due to the bandwidth limitations of plain old telephone service (POTS), there is an inherent inability to efficiently integrate multiple types of media such as telephony, data communication for personal computers (PC), and television (TV) broadcasts. As a result, there is presently great effort toward creating various broadband communication networks that integrate telephony and other communication media. For example, new broadband architectures are developing which transmit voice, data, and multimedia (video and audio) communications using, for example, communication information packets. These communication packets may be constructed in one or more packet protocols such as Internet Protocol (IP) or Asynchronous Transfer Mode (ATM). In general, the type of customer services and feature/function capability that may be implemented in a PSTN is somewhat limited relative to a broadband communication system so a wide range of features/functions are presently being developed for broadband communication systems.

Users of communication devices require more features/functions to make communications more efficient and effective. One such new feature/function to improve communications is provided by the present application for managing multiple communications with a user communication device. For example, a user would benefit from being able to monitor a first communication session on hold while being involved in a second communication session. Further, a user will benefit from being prompted as to the status of a communication session on hold.

SUMMARY OF THE INVENTION

The present invention enables a party which is placed on hold in a first communication session to enter a second communication session and continue to monitor the status of the first communication. For example, in a broadband communication system telephone call or multimedia call, two parties may be in an active communication session with one another and a first of the two parties to the call may receive another incoming call. The first party then places the second party on hold. At this time the second party may wish to place the communication session with the first party on hold to initiate another communication session with a third party. However, the second party would also like to know when the first party takes the communication session off hold so that they can resume their communication. As a result, the second party places the communication on "monitor" hold. While the communication is on monitor hold, the second party is able to monitor the on hold communication session to recognize when the first party returns. For example, the monitored call on hold may be maintained at a reduced volume or a video display of the video in a multimedia communication session may be displayed in a reduced window size on a display.

Further, the present invention may provide prompts to various parties of a communication session when one or more parties to the communication session are placed on hold or taken off hold. For example, the system may generate a prompt to one or more parties when a communication session is placed on hold or monitor hold, or when a communication session on hold or monitor hold is taken off hold.

DESCRIPTION OF THE PREFERRED EMBODIMENTS

The present invention enables a party which is placed on hold in a first communication session to enter a second communication session and continue to monitor the status of the first communication. This feature may be provided by supplying the user with, for example, a reduced volume of the communication session and/or a reduced video image of the communication session to monitor a first communication session on hold while the user is in another active communication session. Further, the present invention may be provided by supplying prompts to various parties of a communication session when one or more parties to the communication session are placed on hold or taken off hold. Unless otherwise indicated by the appended claims, the present invention is not limited to the preferred embodiments described in this section but is applicable to other integrated multimedia communication systems.

I. Integrated Communication System Overview

The present invention is particularly well suited for use in any number of communication networks, for example, new broadband communication networks. One exemplary broadband communication system is described in some detail below and provided in U.S. patent application Ser. No. 09/475,141, which is hereby incorporated by reference for all purposes. Further, it is to be understood that the use of the terms "call" and "communication session" may be used interchangeably throughout the following description and refers generally to any type of communication session including, but not limited to, telephone calls, multimedia calls, etc.

Figure 1:
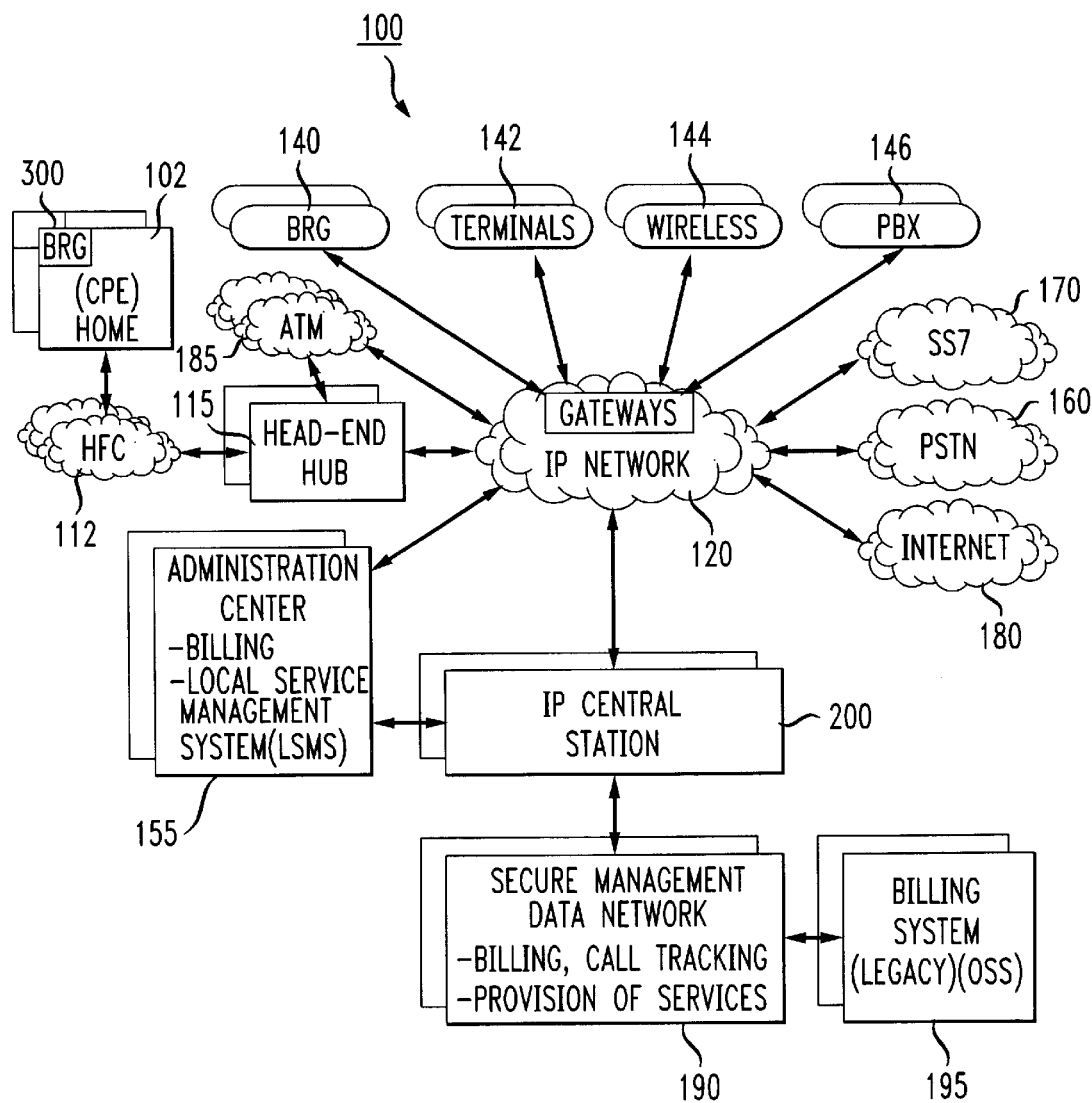
FIG. 1 shows a schematic representation of a broadband network (e.g., broadband IP-based network) in accordance with a preferred embodiment of aspects of the present invention.

Referring to FIG. 1, a broadband communication system 100 is illustrated. The broadband communication system generally provides interconnection between a plurality of customer locations utilizing various interconnection architectures including an Internet Protocol (IP) based network, various existing systems (legacy systems) such as the public switched telephone network (PSTN), ATM networks, the Internet, signaling networks, as well as other systems. The broadband communication system provides versatile intelligent conduits that may carry, for example, Internet Protocol (IP) telephony and/or multimedia signals between the customer premises over, for example, the public switched telephone network, Internet, or wireless communication networks.

Again referring to FIG. 1, the broadband communication system 100 may include one or more customer premises equipment (CPE) units 102. The customer premise equipment 102 may be variously configured. In one example, the customer premise equipment 102 may include one or more local control devices such as a broadband residential gateway (BRG) 300. Although the broadband residential gateway is described herein as disposed in a residence, it may also be disposed in a business or other location, i.e., a broadband business gateway. The broadband residential gateway 300 may be variously configured to provide one or more integrated communication interfaces to other devices within the customer premise equipment 102, such as televisions (TV), personal computers (PC), plain old telephone system (POTS) phone(s), video phones, IP-enabled phones, personal digital assistants (PDA), and other devices. For example, the BRG 300 may provide one or more telephone port connections (e.g., plain old telephone system), Ethernet connections, coaxial connections, fiber distributed data interface (FDDI) connections, wireless local area network (LAN) connections, firewire connections, and/or other connections coupled to a plurality of devices such as plain old telephones, IP based phones, television converters, e.g., cable television (CATV) set top devices, televisions, digital televisions, high definition televisions (HDTV), video phones, and other devices. In exemplary embodiments, the broadband residential gateway 300 may support communications between any of the aforementioned devices in intra-premises calling and/or extra-premises calling. Further, when the broadband residential gateway 300 is used in a business environment, it can function as a private branch exchange or key type telephone system.

The broadband residential gateway may be configured to provide the intelligence needed to allow each of the customer premises equipment devices to operate within the broadband communication system 100. For example, analog voice may be converted to digital data and packetized for transmission in an appropriate output protocol such as an Internet protocol (IP).

In exemplary embodiments, the broadband residential gateway 300 may function to couple devices within the customer premise equipment 102 to the rest of the broadband communication system 100 using any suitable broadband communication mechanism. For example, as illustrated in FIG. 1, the broadband residential gateway 300 may utilize a hybrid fiber-coaxial plant 112 to couple the broadband residential gateway 300 to the rest of the broadband communication system 100. The hybrid fiber-coaxial plant 112 may include coaxial cable and/or optical fiber networks in any suitable combination. The hybrid fiber-coaxial plant 112 may provide an intelligent broadband conduit between the broadband residential gateway 300 and a gateway such as the head-end hub (HEH) 115.

The head-end hub 115 may be variously configured to provide various services and/or interconnections with the rest of the broadband communication system 100. For example, the head-end hub 115 may provide an interconnection point to gather and aggregate external services (e.g., off air and satellite video, public switched telephone network voice, multimedia messages, and Internet data) for distribution to and from the hybrid fiber-coaxial plant 112. With respect to telephony and multimedia calls, the head-end hub 115 may function as intelligent conduit for connection and communication between the hybrid fiber-coaxial plant 112 and external networks such as an IP network 120 and/or an ATM/frame relay/cell relay network 185.

The broadband communication system 100 may include any number of interconnected head-end hubs 115, IP networks 120, and/or ATM networks 185. Further, the IP network 120 and/or ATM network 185 may be connected to one or more other networks and devices such as:

(1) external networks including a public switched telephone network (PSTN) 160, a signaling system 7 (SS7) network 170, an Internet 180, and/or a wireless network 144;

(2) various components including one or more private branch exchanges 146, terminals 142 including computers and wireless devices, and/or one or more stand alone broadband residential gateway 300;

(3) one or more administration centers 155;

(4) one or more secure network management data networks 190 such as a network operations center (NOC);

(5) one or more billing systems 195 such as OSS; and/or (6) one or more centralized control centers such as what is referred to as an IP central station 200.

The IP network 120 and/or ATM network 185 may include one or more routers and/or other devices to route, for example, telephony calls, multimedia calls, signaling messages, administrative messages, programming messages and/or computer data between the various devices in the broadband communication system 100 such as the head-end hub 115, the public switched telephone network 160, the private branch exchange (PBX) 146, as well as the other devices discussed above. In preferred embodiments, the information traveling in the IP network 120 may be packetized and formatted in accordance with an Internet protocol (IP). The IP network 120 may also include gateways to interface with the various other networks and/or devices. For example, the gateways may be distributed at the edge of the IP network where the IP network interfaces with one of the other devices or networks. Alternatively, the gateways interfacing the IP Network 120 to, for example, the Internet 180, public switched telephone network (PSTN) 160, signaling system 7 (SS7) 170, wireless networks 144, ATM/frame/cell relay networks 185 may be provided in the IP central station 200, or in both the IP network 120 and the IP central station 200, and/or partially distributed between the IP network 120 and the IP central station 200. In any case, an appropriate transport protocol may be utilized to logically connect the IP central station 200 or IP network 120 to the particular gateway.

The IP central station(s) 200 may be connected to, for example, one or more IP networks 120, ATM networks 185, secure management data networks 190, and/or administration centers 155. The IP central station 200 may be variously configured to include one or more servers and/or one or more gateways. In exemplary embodiments, the servers and gateways provide the necessary intelligence and traffic management capabilities to enable information, e.g., IP telephony and multimedia communication session signals, to travel through the broadband communication system 100. For example, the IP central station 200 may be configured to manage voice information transferred from the public switched telephone network 160, through the IP network 120, and into and out of one or more devices such as those connected to a broadband residential gateway 300. The IP central station may be configured to store various control and system information such as location, address, and/or configurations of one or more broadband residential gateways 300, as well as other routing and call set-up information.

In exemplary embodiments, one or more administration centers 155 may be connected to the IP network 120 and provide billing and local directory number portability administration. The local number portability may be handled by one or more Local Service Management System (LSMS) which may be included in the administration center 155 and/or in the IP central station 200. Further, the Secure Management Data Network 190 may also include a mechanism for transferring various information such as billing, call tracking, and/or customer service provisioning. Various existing systems may be utilized to provide this information such as existing billing systems (OSS) 195 and/or one or more network operations center (NOC). The network operations centers may be included in the administration center 155, the IP central station 200, and/or the billing system 195. The network operations center (NOC) may be variously configured to include a translation server to allow communications with the various disparate entities (e.g., legacy systems) in the broadband communication system 100.

The IP network 120 and/or the ATM network 185 illustrated in FIG. 1 may include one or a plurality of sub-networks. Each of the sub-networks may include its own IP central station 200 in a distributed configuration, with certain routing data replicated across all IP central stations or each sub-network may be connected to a single centralized IP central station 200. Where the IP network 120 includes one or more sub-networks, each sub-network may be connected to multiple head-end hubs 115. Further, each head-end hub 115 may be connected to multiple hybrid fiber-coaxial plants 112, and each hybrid fiber-coaxial plant 112 may be connected to multiple pieces of customer premises equipment 102 and/or broadband residential gateways 300. The IP network 120 provides an interconnected broadband network which may be utilized to transport and route packetized information to and from diverse geographic locations and may be used on a national or international basis. Further, the IP network 120 and/or ATM network 185 may utilize private network facilities and/or may be provisioned over a shared network such as the Internet.

The IP central station 200 may be configured to provide connectivity for the broadband residential gateway 300 to the Internet 180 (e.g., World Wide Web (www)), as well as connectivity to other external networks such as public switched telephone network 160 and signaling system 7 (SS7) 170 for end-to-end voice, multimedia, and data applications—for example, voice over IP telephony. IP packets traveling through the IP network may provide for priority so that, for example, voice packets are given priority over data packets to maintain certain VoIP telephony QoS requirements.

A. Internet Protocol Central Station

Figure 2:
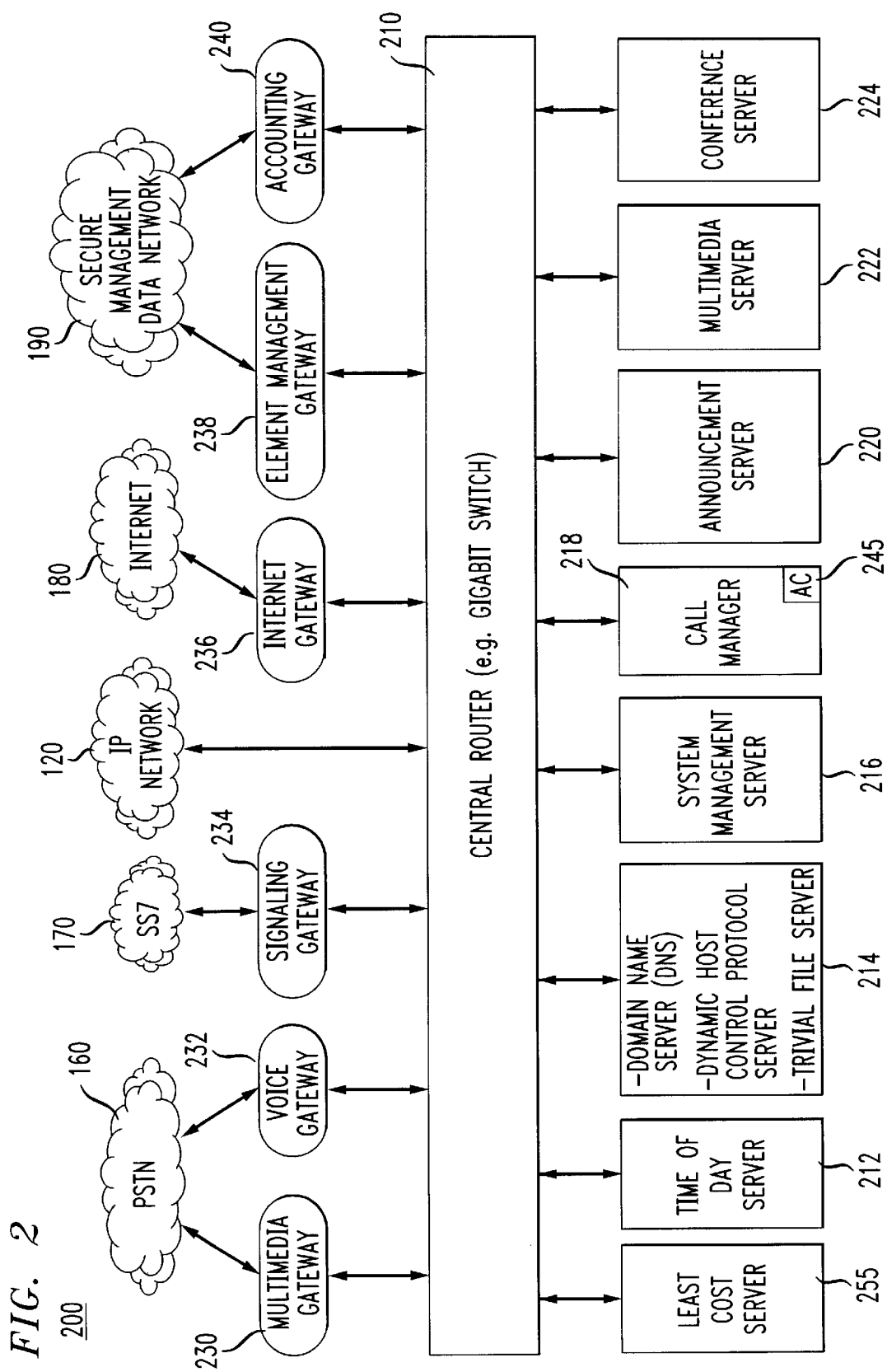
FIG. 2 shows a block diagram of a preferred embodiment of a centralized control (IP central station) in accordance with aspects of the present invention.

Referring to FIG. 2, the IP central station 200 may be variously configured. In preferred embodiments, it may be configured to ensure seamless integration of IP-based communication systems including the IP network 120 with the public switched telephone network 160, signaling system 7 (SS7) network 170, and the Internet 180 so that packetized data—for example, voice calls and information data—is properly transferred between the broadband residential gateway 300, the public switched telephone network 160 and/or the Internet 180. In one embodiment, the hybrid fiber-coaxial plant 112, head-end hub 115, and IP network 120 provide a virtual signaling conduit for packetized voice and data which may, with the coordination of the IP central station 200, be provided in the appropriate format between the broadband residential gateway 300 and the public switched telephone network 160 and/or Internet 180.

Again referring now to FIG. 2, the IP central station 200 may include a central router 210, for example, a gigabit switch, which may be utilized to interconnect various servers and gateways contained in the IP central station 200. The central router 210 provides, for example, Ethernet switching and aggregate traffic between servers, gateways and the IP network 120 and/or ATM network 185 backbone. In one exemplary embodiment, the central router 210 provides high-speed, non-blocking IP and IP multicast Layer 3 switching and routing. The IP central station 200 may include one or more of the following servers: the least cost server (LCS) 255; the time of day (TOD) server 212; the dynamic host control protocol (DHCP) server, the trivial file transfer protocol (TFTP) server, and the domain name service (DNS) server 214; the system management (SM) server 216; the call manager (CM) server 218; the announcement server (AS) 220; the multimedia server (MS) 222; and/or the conference server (CS) 224. As illustrated in FIG. 2, the servers may be separate servers, e.g., the call manager server 218, or may be incorporated into a single server, e.g., the DHCP, TFTP, and DNS server 214. In the exemplary embodiment, the dynamic host control protocol server 131, trivial file transfer protocol server 132, and the domain name service server 133 are each incorporated in a single server facility 214. Each server in the IP central station 200 may include computer(s), storage device(s), and specialized software for implementing particular predefined functions associated with each server. In this manner, the servers in the IP central station may be provisioned as a main server and one or more back-up servers to provide redundant processing capabilities. Similarly, the router may be implemented as a main router and a back-up router with similar routing functionality.

The IP central station 200 may also include, for example, one or more of the following gateways: an element management gateway (EMG) 238; an accounting gateway (AG) 240; an Internet (Boarder) gateway (IG) 236; a signaling system 7 (SS7)) gateway (SG) 234; a voice gateway (VG) 232; and/or a multimedia gateway (MG) 230. The IP central station 200 may utilize one or more of these gateways to provide centralized system intelligence and control of voice and/or data IP packets.

In exemplary embodiments, the dynamic host control protocol server and domain name service server 214 may operate to dynamically assign IP addresses to devices in the customer premise equipment 102. Where a dynamic IP assignment scheme is used, the customer premises equipment may be provided with one or a plurality of dynamic IP assignments when activated initially, and/or at the initiation of each active session. Where an IP address is assigned when the device is initially activated, it may be desirable to assign a single IP address to a single broadband residential gateway and assign a port address to devices connected to the broadband residential gateway 300. In other embodiments, an individual IP address may be assigned to each device coupled to the broadband residential gateway 300.

The trivial file transfer protocol (TFTP) server 214 may be configured to transfer certain information to/from one or more broadband residential gateways 300. In exemplary embodiments, the trivial file transfer protocol server provides Data Over Cable Service Interface Specifications (DOCSIS) configuration information containing QoS parameters and other information required for the broadband residential gateway 300 to operate optimally.

The time-of-day (TOD) server 212 may include a suitable facility for maintaining a real time clock such as an RFC868-compliant time server. In exemplary embodiments, the time-of-day server 212 provides system messages and/or responses to system inquiries containing a coordinated time, e.g., universal coordinated time (UCT). The universal coordinated time may be used by any of the servers and/or devices in the broadband communication system 100. For example, the broadband residential gateway 300 may use the universal coordinated time to calculate the local time for time-stamping error logs.

The system management (SM) server 216 may include responsibility for the overall operational state and functioning of components the broadband communication system 100, either alone or in combination with other system management servers 216. The system management (SM) server 216 may be variously configured to provide monitoring and administrative functions for devices within the broadband communication system 100. For example, the system management server 216 may be configured to provide management of various database functions, memory buffer functions, and software utility functions within the broadband communication system 100. Software management includes, for example, version control, generic control, and/or module control.

The least cost server (LCS) 255 may be variously configured to enable the system to determine the least cost routing of telephone and data transmission throughout the network. The least cost server 255 may also provide one or more broadband residential gateway users capability to select between, for example, cost and Quality of Service (QoS).

The announcement service (AS) server 220 may be variously configured. In exemplary embodiments, it may store and send announcements to specified destinations and/or all destinations based on instructions received by, for example, the call manager (CM) server 218. The announcement server 220 receives, for example, Media Gateway Control Protocol (MGCP) or later signaling (e.g., H.GCP—an ITU standard Gateway Control Protocol) control messages from the call manager 218, and sends announcements to one or more voice gateways (VG) 232 and/or the one or more broadband residential gateway 300 (e.g., using Real Time Protocol (RTP) packets). The announcement server 220 may send an announcement once, a predetermined number of times, or in a continuous loop. The announcement server 220 may detect when a phone or other device has been taken off-hook and play an advertisement or other announcement to the user. The announcement server 220 may further provide for announcements including a call placed on hold announcement and a call taken off hold announcement. The announcement server 220 may respond to requests from individual system devices such as one of the broadband residential gateways 300 and/or under control of, for example, the call manager 218. Where the announcement server is under control of the call manager 218, the call manager may be configured to control various operating parameters of the announcement server. For example, the call manager 218 may request that certain announcements are sent once, a specified number of times, or in a continuous loop.

In still further embodiments, announcements may be generated elsewhere in the broadband communication system 100, stored as files, and distributed to one or more announcement servers via a file transfer protocol or resource such as the trivial file server 214 using one or more file transfer protocols. In many embodiments, it is desirable to store announcements in an appropriate encoding format (e.g., G.711 or G.729) within the Announcement Server. The announcement may have an audio component, a text component, and/or an audio/video component. The audio/video component may be stored using a combination of an encoding format (e.g., G.711) and/or a standard file format such as wave (WAV), MPEG, and other suitable formats.

In one exemplary method of operation, a user picks up a telephone, places a call on hold, or takes a call off hold, which sends a signal to the call manager 218. Subsequently, the call manager 218 may establish a connection to the announcement server 220 and play one or more pre-recorded and/or predetermined announcements (e.g., hypertext, audio, and/or audio/video). Signaling tones such as a busy signal may be played by the broadband residential gateway 300 or the call manager 218, and Special Information Tones (SIT) and/or messages may also be included as part of an announcement file. In this way, the user experience is enhanced such that the user receives a busy message and/or hypertext announcement providing one of several options for contacting the called party. The announcement server 220 may have information entered by a user using, for example, a broadband residential gateway to provide additional information to the called party. The additional information may include the ability to leave a message, type-in a chat note, page the called party, barge-in on the call, notify that the call has been placed on monitor hold, and/or other user-defined or system-defined call handling capabilities.

The announcement server 220 may also be programmed with various system messages such as an announcement indicating that a number dialed is incorrect or that the call did not go through as dialed, that the lines are busy, that all lines between two countries are currently busy, that the called party has changed numbers, that the called party's phone has been disconnected, that one or more system errors have occurred, and/or other announcement messages.

The call manager (CM) 218 may be variously configured. In exemplary embodiments, the call manager 218 provides a centralized call control center for supporting call set-up and tear-down in the broadband communication system 100. The call manager 218 may be configured to include trunk and line information maintenance, call state maintenance for the duration of a call, and/or user service features execution. The call manager 218 may also provide for call processing functions such as a standardized call model for processing the various voice connections such as voice over IP calls. In exemplary embodiments, a standardized "open" call model may be utilized which supports standardized application programming interfaces (APIs) to provide transport services and other user functions such as calling cards. An open application programming interface and call set-up interface in the call manager will enable third-party applications to be loaded into the call manager 218 and broadband residential gateway 300. This will facilitate the development of third-party applications for enhancing the functionality of components in the broadband communication system 100. For example, third parties and other equipment vendors may manufacture various broadband residential gateways 300 for use in the broadband communication system 100 by writing applications to support the open call model of the call manager 218. The call manager 218 and/or broadband residential gateway 300 may also be configured to execute and/or accept commands from a standardized scripting language which may generate instructions for the call manager 218 and/or broadband residential gateway 300 to execute various functions. The scripting functionality may include the ability to execute an entire call model including interfaces to the signaling system 7 (SS7) 170, public switched telephone network 160, IP network 120, ATM/frame/cell relay network 185, and/or other functions within, for example, IP central station 200 such as the multimedia server 222, announcement server 220, system management server 216, conference server 224, time of day server 212, least cost server 255, and/or domain name server 214.

The call manager 218 may also be configured to maintain the call states for each call it handles (e.g., a voice over IP call) and respond to system events created by, for example, the multimedia gateway control protocol (MGCP) messages and/or integrated services digital network user part (ISUP) messages for signaling system 7 (SS7) protocol that may occur during the processing of a call. Exemplary events handled by the call manager 218 include call state changes, call feature changes/call feature triggering events, changes in the status of lines and trunks, and/or error conditions. Further, the call manager 218 may interact with devices connected to a single circuit on the public switched telephone network 160 and/or a device connected to a port of the broadband residential gateway 300. In this manner, new devices may be added to the infrastructure and operate using the open call model contained in the call manager 218.

The call manager 218 may also include storage for subscriber and network configuration, a cache server for faster access to frequently used data, a routing engine for selecting an appropriate routing algorithm (e.g., least cost routing), and/or a service broker which provides the data and logic for specific services. In addition, the call manager 218 may include an authentication (AC) server 245 that provides authentication of various devices, objects, packets and users in the integrated multimedia system. In this manner, a user may verify the identity of the calling or called party.

The call manager 218 may interact with the signaling gateway (SG) 234, the accounting gateway (AG) 240, the element management gateway (EMG) 238, the voice gateway (VG) 232, and the multimedia gateway (MG) 230 using any suitable protocol such as IP and an interconnection mechanism such as the central router 210. In one preferred embodiment, the call manager 218 may be configured to utilize signaling messages such as: a) ISUP messages over Common Object Broker Architecture (COBRA) interface to and/or from signaling gateway 234; b) MGCP, SIP (simple internet protocol), H.GCP, and/or other suitable control messages to and/or from the announcement server 220; c) call event records in modified Radius format to the accounting gateway 240; d) Radius (or Enhanced Radius or compatible protocol) control messages to and/or from the voice gateway 232 and/or the broadband residential gateways 300; and e) signaling network management protocol (SNMP) messages to and/or from the element management gateway 238.

The call manager 218 may incorporate one or more databases. For example, the call manager 218 may include database information such as (1) a resources database that provides an identification of what resources are connected to the broadband communication system 100 and their current state; (2) a trunk/gateway database that indicates which gateway serves what circuits in a trunk; (3) a customer database which indicates whether a call is authorized, identifies what services a line supports and determines whether a telephone number is on or off the integrated IP communication network; (4) a numbering plan/least cost routing database which provides routing information that enables the IP central station 200 to choose the correct trunk as a function of the call number; (5) a local number portability (LNP) database that indicates the North American Numbering Plan (NANP) and associated prefixes which are open for association with the number portability service; and (6) an address of the service control point (SCP) towards which requests for translating these local portability numbers should be routed.

In exemplary embodiments, the broadband communication system 100 includes equipment compatible with the COBRA standard. COBRA may be utilized to allow applications from a plurality of vendors to operate with each other. The COBRA standard allows a company, such as AT&T, to build its network using multi-vendor equipment and yet ensure seamless integration and operation. Some of the major areas covered by COBRA v. 2.2 include: Inter-ORB Bridge Support, General Inter-ORB Protocol (GIOP) support, Internet Inter-ORB Protocol (IIOP) support, and Environment Specific Inter-ORB Protocol (ESIOP) support. The call manager 218 may integrate these protocols to facilitate call set-up with diverse equipment. This is advantageous in that equipment from a plurality of vendors may inter-operate over the broadband communication system 100 without modification.

The multimedia server (MS) 222 may be variously configured. For example, one or more multimedia servers may provide support for multimedia messaging service and/or the overall management of multimedia voice and mail messages transmitted across the broadband communication system 100. The multimedia server may be configured to support e-mail (e.g., html) messages, voice mail (audio) messages, and/or video mail (audio and video) messages. The multimedia messages may include standard pre-configured system messages, advertising messages, and/or user-defined messages. In any event, where the messages are stored in a centralized location, the multimedia server may provide such storage. Where the multimedia server 222 provides storage for the multimedia messages, a database may be utilized for indexing, storage, and retrieval of such messages. In exemplary systems, the user may access predetermined ones of these messages. The multimedia server 222 may utilize IP as a method of communicating with other devices across the broadband communication system 100.

The conference server (CS) 224 may be configured to provide for multiparty conference calls using, for example, IP voice packets during an IP telephony or multimedia session call. The conference server 224 may include specialized software that runs on a computing platform having associated multiplexing and demultiplexing capability for segregating and aggregating user information packets. For example, the conference server may log several calls into a conference session. When information packets are sent from one or more phones, they are aggregated and sent to the other phones on the conference call. The conference server 224 may use any suitable communication protocol such as H.GCP or SIP. The conference server 224 may function to aggregate user information from two or more users onto a single call path. The conference server 224 may include one or more "call-in numbers" and be controlled from any location, e.g., a centralized operator location and/or one or more broadband residential gateways 300. It may be desirable to have the conference server 224 configured such that some callers simply monitor the call without voice interruption while other callers have both voice transmit and receive capabilities. Where a caller is not given the privileges associated with active participation in the call, voice packets from these users are discarded. For example, a CEO may have a conference call with a plurality of financial advisors and invite the press to listen in on the call without interruption capabilities. A similar function may be provided by the CS 224 for the monitor hold feature. In this case, information packets, e.g., voice packets, from one party for a call on hold will be sent to an other party, while the other party has been placed on monitor hold.

The gateways in the IP central station 200 may be configured to provide translation of signals to and/or from the various servers in the IP central station 200, the IP network 120, the public switched telephone network 160, the signaling system 7 (SS7) network 170, the Internet 180, and/or the secured management data (SMD) network 190. The gateways typically support one or more of the following group of functions: call processing; signaling system 7 (SS7) connectivity; billing support; OAM&P support; connection to public switched telephone network; control CoS/QoS parameters; and enhanced services.

The voice gateway (VG) 232 may be connected to the public switched telephone network 160 and operate to convert between IP-based voice packets and standard public switched telephone network 160 voice traffic. Voice gateway 232 may be configured as multi-frequency (MF) or ISUP gateways on a per-T1 basis. Where multi-frequency (MF) trunks are used, one embodiment utilizes signaling between the call manager 218 and the voice gateway 232 using MGCP, SIP, H.GCP and/or other compatible protocols. Multi-frequency trunks may be compatible with Feature Group D (FGD), Operator Service (OS) Signaling protocol and/or Termination Protocol (TP).

The IP central station 200 may be variously connected to the public switched telephone network. For example, the IP central station 200 may be connected directly to the public switched telephone network using, for example, a bearer channel (e.g., a T1 or T3 carrier) and/or interconnected using one or more networks such as an IP network and/or ATM/frame/cell relay network 185.

Voice gateway 232 may be router-based and include one or more voice feature cards and/or DSP Module cards to perform voice processing. The voice gateway 232 may optionally include host processors, LAN/WAN ports, Ethernet ports, T1 or E1 telephony interface cards, Voice Feature Cards with DSP Modules providing voice compression transcoding (G.711 and G.729), carrier-quality echo cancellation with 8 ms–32 ms tail length, a de-jitter buffer which adapts to delay variations in the network in order to minimize the delay, packet loss concealment that generates concealment frames for lost packets using information from previously received data, and/or tone detection and generation. This function detects Multi-Frequency (MF) tones and generates MF and call processing tones (e.g., dial tone, call-waiting tone etc.).

In exemplary embodiments, the voice gateway 232 may include T1/E1 interfaces with internal Channel Service Units (CSUs). It may also be desirable to configure the voice gateway 232 such that ISUP, MF and Centralized Attendant Services (CAS) trunks are supported with a configuration done on a per-T1 basis. Additionally, multi-frequency tones and Centralized Attendant Services may utilize a "robbed bits" communication scheme where bits are "robbed" from sub-frames to transmit in-band signaling. The multi-frequency tones may be converted to and/or from, for example, simple gateway control protocol (SGCP) signal requests and events by the voice gateway 232. For example, multi-frequency tones and/or lower level signaling and timing functions may be translated to and/or from any of the following indications: simple gateway control protocol Notify functions, simple gateway control protocol Notification Requests, Connection requests, Modify Connection requests, off-hook and/or on-hook indications.

An Ethernet interface with an RJ-45 connector may be used to connect the voice gateway 232 to the central router 210 (e.g., Gigabit Switch or High Speed Router (HSR)). The multimedia gateway control protocol may be used as the interface between the voice gateway 232 and the call manager 218. For example, call control, signaling, and multimedia data stream, real time protocol (RTP) connections, IP addresses, UDP ports, codec choice, etc. may be configured in any suitable manner, such as by using a multimedia gateway control protocol. In exemplary embodiments, audio streams may be passed directly between customer premises equipment 102 using real time protocol connections over, for example, a user datagram protocol (UDP). Thus, the multimedia gateway control protocol may be utilized to request the voice gateway 232 to initiate, cancel, and/or otherwise modify connections in order to set up and tear down RTP media streams. A similar procedure may also be utilized to request continuity tests and results.

The multimedia gateway (MG) 230 may be configured to connect to the public switched telephone network 160 and to convert IP-based multimedia packets into standard public switched telephone network 160 traffic. The multimedia gateway 230 may include an intelligent trunking interface that communicates with the call manager 218 for automatic trunk sizing and allocation between the IP network 120 and the public switched telephone network 160. For example, when a system user at the customer premises is using a PC and/or a multimedia phone to communicate with a traditional public switched telephone network 160 user, the communication session involves the transmission of video and audio data. The bandwidth that is required for this type of communication is much greater than that required for a PSTN-to-PSTN voice call or an IP-to-PSTN voice call. The multimedia gateway 230, as the interface between two systems, may negotiate a larger bandwidth to facilitate the call if the called party is also video-enabled. This bandwidth negotiation process typically occurs with a 5ESS or a Local Digital Switch within the public switched telephone network 160. Typically, a multimedia call, including live video, audio and data, will require bandwidth ranging from 56K to 1.544 Mbps. However, as the number of users sharing the same link grows, the quality of the transmission deteriorates significantly. The multimedia gateway 230 must be able to monitor bandwidth usage and make appropriate adjustments so as to maintain an acceptable quality of service. Further, it may be desirable for the call manager 218 and the multimedia gateway 230 to communicate between themselves and/or the customer premises equipment 102 to determine whether the user has authorized the additional bandwidth, and hence expense, of the call. For example, even where a called and/or calling party is video-enabled, it may nonetheless refuse to authorize payment for the increased bandwidth necessary for video.

In exemplary embodiments, it may be desirable to adapt the IP network to carry signaling system 7 (SS7) Transaction Capabilities Application Part (TCAP) messages over the IP network 120 and/or the ATM/frame/cell relay network 185. The transport of signaling system 7 (SS7) transaction capabilities application part (TCAP) messages over the packet networks allows signaling operations to be supported by multiple connections to the same host, multiple host connections, and distributed processing of call set-up information using, for example, multiple call managers 218 in the broadband communication system 100. Thus, the IP network 120 and/or ATM/frame/cell relay network may be utilized to interconnect a plurality of ESS switches to transport signaling information, voice, and/or data. In embodiments where the signaling gateway (SG) 234 is configured to support signaling system 7 (SS7) signaling transport using transaction capabilities application part (TCAP) messages, it may be desirable to include a translator for converting between multimedia gateway control protocol (MGCP) messages and transaction capabilities application part (TCAP) messages and/or ISDN User Part (ISUP) messages.

The point where ISUP and TCAP messages are terminated at a signaling system 7 (SS7) signaling gateway is defined as a Service Switching Point (SSP) to the signaling system 7 (SS7) network 170. The call manager 218 may be configured with a standardized Application Programming Interface (API) to allow interaction with the signaling system 7 (SS7) by, for example, sending and/or receiving ISUP and TCAP messages from a service switching point (SSP). Full class 5 signaling system 7 (SS7) functionality may be included in the call manager 218, including the ability to provide all of the information necessary for billing as defined in the GR-246-Bellcore standard. The signaling gateway 234 may be arranged to perform: signaling system 7 (SS7) message handling (message discrimination, message distribution, and message routing); signaling link management (e.g., link activation, deactivation); signaling route management (managing Point Code [PC] route status based on route received management messages such as Transfer Prohibited, Transfer Allowed, Transfer Restricted, etc.); and signaling traffic management (diversion of traffic based on unavailability, availability, restriction of signaling link, route, and Point Code.) The signaling system 7 (SS7) architecture supports the necessary redundancy component scheme for system reliability and availability during scheduled maintenance and/or software/hardware upgrades. The signaling gateway 234 may be configured to directly provide for lower level signaling system 7 (SS7) processing.

In exemplary embodiments, the signaling gateway 234 interacts with the call manager 218 using an appropriate open interface (e.g., Common Object Request Broker Architecture (COBRA)). In these embodiments, it may be desirable for translation software in the signaling gateway 234 to add Message Transfer Part (MTP) layer information to the ISUP and/or TCAP data to create a complete signaling system 7 (SS7) message. The complete signaling system 7 message may then be sent to the Signaling Transfer Point (STP) in the external signaling system 7 (SS7) network 170. Conversely, the signaling gateway 234 may be configured to remove ISUP or TCAP application layer data from the signaling system 7 (SS7) messages received from the STP prior to converting the information to an appropriate open interface (e.g., COBRA) and forwarding the information to the call manager 218 via the central router 210.

The accounting gateway (AG) 240 may be configured to receive messages representing events from the call manager 218 via a suitable transport mechanism such as the central router 210. Typically, two messages are received for each call, the first when the call is established, and the second when the call terminates. In the case of unsuccessful calls, only the failure message will be logged. The messages provide details about the calling and called parties, the timing of the call set-up, the duration and the quality of the call. Accounting gateway 240 may be duplicated using a redundant computer, with each gateway having dual-mirrored disks. The accounting gateway 240 stores usage records and may then distribute them to linked destinations (e.g., billing centers) for processing. Billing centers typically include bill processors that receive accounting information from the accounting gateway 240 and generate appropriate on-line or paper billing to customers. Further, the accounting gateway may both retain and forward data to the billing centers. In this manner, if the equipment at the billing center fails, the accounting gateway 240 may serve as a backup. Similarly, the billing center may act as a backup where the accounting gateway 240 fails.

An Automatic Message Accounting (AMA) format is typically used by circuit-switching systems, packet-switching systems, and other network elements to provide billing usage measurements data. This data may be utilized either to permit charging the customer for use of network resources or to permit charging other carriers (e.g., InterExchange Carrier (IEC) and other Local Exchange Carrier (LEC)) for assistance in placing call connections. The accounting gateway 240 may be configured to convert this information into Automatic Message Accounting (AMA) format records and send these records to the external billing systems using, for example, a TFTP (trivial file transfer protocol). Time-stamp accuracy is typically based on the accuracy of the call manager 218 clock which may be derived from the TOD 212 server. To create appropriate AMA records, the event information produced by the call manager 218 preferably has appropriate information for the telephone service specified, such as phone number of the calling party (customer), phone number of the called party (customer), time of call, duration of the phone call, and use of any discretionary features. Different AMA structures may be generated between On-Net calls (defined as within a network service provider IP network 120) vs. Off-Net calls (defined as outside of service provider IP network—e.g., public switched telephone network) for billing purposes.

The element management gateway (EMG) 238 may provide system management functionality that includes, for example: a) status and performance monitoring for the Operation Administration, Maintenance, and Provisioning center, to gauge the ongoing operation of applications; b) extensive information exchange with a network operations center responsible for ongoing maintenance of one or more applications; c) customizable operations interface to allow the network operations center to view only information required, thus reducing the time spent filtering information; d) centralize distributed application configuration allowing for the centralized configuration of objects residing on a plurality machines; e) proactive network management capabilities to remove the need for constant operator intervention making the day-to-day operations more efficient; and/or f) intelligent display of status information to separate critical issues from low-priority problems, allowing the operation center to assign resources to the right problems at the right time.

The Internet gateway (IG) 236 may be connected to the Internet (e.g., World Wide Web (www)) and provide a means for IP-based data packets to be to routed between the IP network 120 and the Internet 180. Alternatively, IP-based voice packets may be routed via the Internet 180. In exemplary embodiments, the Internet gateway 236 routes data-only packets which may share the same priority level with other lower priority, non-real-time traffic consistent with computer data communications presently experienced with the Internet 180. Consequently, low priority and low latency data traffic on the IP network 120 utilize the Internet gateway 236 to communicate with other IP data networks such as the www. Voice packets may be routed through another network such as the ATM/frame/cell relay network 185, a private IP network 120, and/or the public switched telephone network 160 where committed information rates may be easily obtained.

In exemplary embodiments, the broadband communication system 100 includes the interfaces which enable connections to existing Operation, Maintenance and Provisioning (OAM&P) 195 systems that support, billing, accounting, provisioning and/or configuration management functions. (See FIG. 1.) A Secured Management Data (SMD) Network 190 may be utilized to connect the OAM&P 195 to the accounting gateway 240 and element management gateway 238. The Secure Management Data network 190 may include a Network Service Division's NSD Net. The Secure Management Data network 190 helps ensure that only secure communication can occur between the IP central station 200 and the OAM&P 195. This eliminates one potential means of tampering with the billing and provisioning functions in the OAM&P. The billing systems (OSS) 195 may include the Network Operations Center (NOC). The NOC may include a translation server which includes functions for allowing communications and control of diverse networks.

B. Broadband Residential Gateway (BRG)

Figure 3:
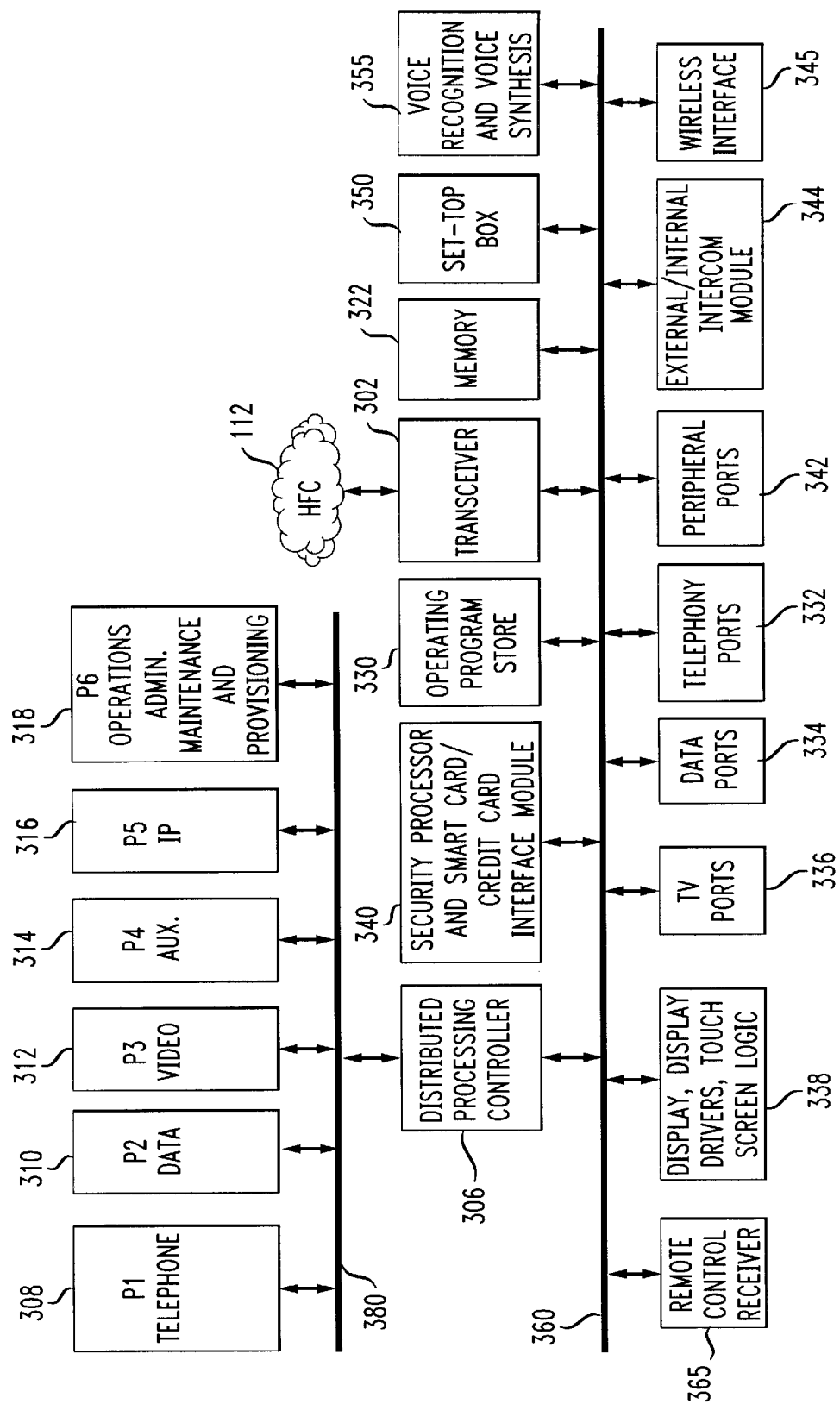
FIG. 3 shows a block diagram of a preferred embodiment of a local control apparatus (broadband residential gateway) in accordance with aspects of the present invention.

Referring to FIG. 3, a preferred embodiment for a broadband residential gateway (BRG) 300 will now be described and explained. The broadband residential gateway 300 may be configured as the interface unit between the remainder of the customer premise equipment 102 devices and the external broadband communications network. The broadband residential gateway 300 may be connected to the remainder of the broadband communication system 100 using any suitable mechanism such as a gateway directly into an IP network and/or a cable connection. In the most preferred embodiments, a hybrid fiber-coaxial plant connection is utilized such as hybrid fiber-coaxial (HFC) plant 112. The hybrid fiber-coaxial plant 112 allows numerous broadband residential gateways 300 to be included on an existing hybrid fiber-coaxial plant 112 without modification to the plants infrastructure.

The broadband residential gateway 300 may be variously configured to, for example, provide high-speed cable modem capabilities to interconnect one or more associated PCs with each other and with the remainder of the broadband communication system 100, provide functionality to one or more TVs (using, for example, either an integrated or separate decoder functionality, e.g., set top box 350), one or more telephone connections such as plain old telephone service (POTS) phones and/or digital telephones, displays, wireless interfaces, voice processing, remote control interface, display interface, and/or administrative functions. In exemplary embodiments, the broadband residential gateway 300 may a) provide conversion between analog voice and IP voice packets, b) multiplex/demultiplex streams of IP voice packets, and c) support multiplex/demultiplex of multiple incoming and outgoing signals including multiple voice, multimedia, data, system administration, and/or TV information signals in a seamless manner.

Where the elements of the broadband residential gateway 300 are interconnected, the interconnection may be provided by one or more data buses, for example, a high speed bus (HSB) 360, processor bus 380, and/or other interconnection system. The high speed bus 360, 380 may be configured to provide a flexible conduit for transferring information between the internal hardware, processors and ports. In exemplary embodiments of the broadband residential gateway 300, the high speed bus 360 may include one or more of the following functional units: a) a universal remote control receiver module 365 for receiving wireless (e.g., infrared, and/or RF) signals (e.g., keyboard signals and/or remote control signals) for control of the broadband residential gateway 300 and/or any connected devices; b) a display, display driver, touch screen logic module 338 for driving one or more local and/or remote displays for interfacing with the broadband residential gateway 300 and/or one or more connected devices; c) one or more TV port modules 336 for interconnecting televisions, set-top devices, and/or other audio/visual devices to the broadband residential gateway 300; d) one or more data port modules 334 for connecting/interconnecting data-enabled devices (e.g., personal computers, palm top devices, etc.); e) one or more telephony port modules 332 for interconnecting one or more analog and/or digital telephones; f) one or more peripheral port modules 342 for interconnecting one or more peripheral devices such as disk drives, data storage devices, video cassette recorders, DVD devices, audio devices, video devices (e.g., camcorders, digital cameras, digital video recorders, stereos, etc.); g) one or more external/internal intercom modules 344 for interconnecting remote intercom and/or security monitoring devices; h) one or more wireless interface modules 345 for interconnecting with various wireless extension devices such as wireless TVs, cordless and/or wireless telephones, wireless LANs, etc.); i) one or more voice recognition/voice synthesis modules 355 for generating voice announcements, voice messages, and voice prompts and for recognizing voice generated commands and data; j) set-top box module 350 for performing the functions associated with a set-top box locally and/or for communicating with one or more remotely coupled set-top boxes; k) memory 322 (e.g., DRAM, RAM, flash, and/or other memory) for storing information and operating data within the broadband residential gateway 300; l) transceiver 302 for communicating with one or more external broadband networks; m) operating program store 330 (e.g., ROM, flash, etc.) for storing at least portions of the operating programs for the broadband residential gateway 300 and/or interconnected devices; n) security processor, smart card and/or credit card interface module 340 for providing secure processing functions and/or credit card/smart card transaction functions; and/or o) distributed processing controller 306 which may be a microprocessor and/or one or more interconnected distributed processing modules for controlling the broadband residential gateway 300. Where the distributed processing controller 306 includes one or more distributed processing modules, the modules may include a telephony processing module (P1) 308, data processing module (P23) 310, video processing module (P3) 312, auxiliary processing module (P4) 314, IP processing module (P5) 316, and/or an operations administration maintenance and provisioning processing module (P6) 318 interconnected through one or more busses such as processor bus 380. The processor bus 380 and/or high speed bus 360 may include any suitable interconnect bus including intelligent bus configurations incorporating smart buffer logic (not shown in FIG. 3) to facilitate data transfer between interconnected processors and/or modules. The various modules and/or processing components of the broadband residential gateway 300 may be powered by, for example, a power supply unit. (not shown). Each of the individual modules of the broadband residential gateway will now be described in more detail.

The transceiver 302 may include circuits for converting digital signals to and from RF signals suitable for transmission across a broadband network such as the hybrid fiber-coaxial plant 112. The transceiver 302 may include one or more input/output ports such as a cable interface (e.g., an F connector cable connection) and/or a fiber optic interface connected to a communication media (e.g., hybrid fiber-coaxial Plant 112). The transceiver 302 may be compatible with the DOCSIS 1.0 or later specifications. For signaling purposes, the broadband residential gateway 300 may be compatible with the Media Gateway Control Protocol (MGCP) or other compatible signaling protocol (e.g., SIP or H.GCP) to support telephony applications. The transceiver 302 may serve as a modem, a translator and/or a multiplexer/demultiplexer. Data received from the network may be de-multiplexed and placed on the data bus for dispatch to the appropriate peripherals and/or ports. Data from the various ports and peripherals may be multiplexed together for distribution over one or more broadband networks (e.g., the hybrid fiber-coaxial (HFC) plant 112). Where a hybrid fiber-coaxial plant 112 is utilized, the data may be multiplexed onto various frequency bands of the hybrid fiber-coaxial plant 112 in a continuous data stream(s) and/or packetized data stream(s). To facilitate data transfer for various networks, the transceiver 302 may include one or more registers for data queuing and/or IP tunneling of data packets across the broadband network.

Although the illustration of a display, display drivers, and touch screen logic device 338 suggests that a display is integral to the broadband residential gateway 300, alternative embodiments of the broadband residential gateway 300 may provide a user interface via the TV screen, PC screen, video telephone, and/or other display device in addition to, or in lieu of, a display integral to the broadband residential gateway 300.

The peripheral ports module 342 may include a plurality of ports providing connectivity to external peripherals. Exemplary interfaces include PCI, Firewire, USB, DB25, etc. Devices which incorporate one or more of these interfaces may utilize the broadband residential gateway 300 to interconnect to the remainder of the broadband communication system 100.

The external/internal Intercom Module (IM) 344 may include one or more microphones/speakers, voice CODECs, telephony processors, and/or interface ports. Where an intercom module 344 is utilized, the built-in circuitry may be configured to detect, for example, unused plain old telephone system telephone(s) and generate a special intercom tone on these unused telephones. In this manner, existing plain old telephone system telephones, digital phones, and/or other devices may serve as an intercom throughout the residence. The controller 306 (e.g., the P1 telephony processor 308) may function to command the intercom module 344 to determine an appropriate intercom path to select an intercom connection between various locations. In exemplary embodiments, the CODEC may be configured to convert the analog voice signal into IP packets for transmission over one or more data ports 334, TV ports 336, display modules 338, telephony ports 332, peripheral ports 342, external/internal intercom ports 344, wireless interface ports 345, and/or set-top boxes 350.

In addition to intercom services, the intercom module 344 may also configure intercom services for other telephony services (e.g., extension transfer, call conferencing, internal caller ID), high speed data services (e.g., LAN connections), facsimile transmission/reception, e-mail transmission/reception, video conferencing, and/or CATV/HDTV (Cable Television/High Definition Television) using standard industry protocols such as DOCSIS 1.0 or higher and IP tunneling transmissions. These services are advantageous in that, once configured, the user may simulate a work environment in his home.

Though processing may be accomplished by a single processor performing all functions (e.g., processing controller 306), in the preferred embodiment shown in FIG. 3, the architecture employs a distributed processing controller 306, and a plurality of processors P1–P6 308–318. In the distributed processing architecture, each of the plurality of processors P1–P6 may be configured to have a dedicated function to provide predetermined services or applications. The processors may be coupled together via any suitable mechanism such as the processor bus 380 and/or high speed bus (HSB) 360. The first processor P1 308 may include telephony applications such as call set-up, call tear-down, and call functions; the second processor P2 310 may include management functions such as distribution and coordination of data within the various devices of the broadband residential gateway 300; the third processor P3 312 may include video processing functions for configuring control panels, screen displays of attached devices, video conference calls, MPEG decoding functions and other video processing functions; the fourth processor P4 314 may include an auxiliary processor for off-loading special processing functions such as numeric processing; the fifth processor P5 316 may include interface input/output processing (e.g., text to voice and vise versa) and/or Internet protocol (IP) processing functions for configuring data to communicate with the remainder of the broadband communication system 100 and/or devices attached to the broadband residential gateway 300 such as IP telephones or IP enable PCs; and the sixth processor P6 318 may include processing functions for Operation, Maintenance and Provisioning (OAM&P) processing. Each of the above processors may be an entirely separate processing unit with included RAM, ROM, Flash memory, or may share RAM, ROM, and/or Flash memory. Where shared RAM, ROM, and/or Flash memory is utilized, the memory may be located within the distributed processor controller 306 and/or on the processor bus 380. Alternatively, the memory may be integrated into the operating program store 330 and/or into memory 322.

The Distributed Processing Controller 306 with its associated processors (P1–P6) may be coupled to the various elements of the broadband residential gateway 300 so as to enable proper operation of each of the individual components. For example, the distributed processing controller 306 (with any associated processors (P1–P6)) may also be coupled to the security processor, smart card/credit card, and interface module 340, the peripheral port(s) module 342, and/or the External/Internal Intercom Module 344 for providing control and coordination among devices coupled to the high speed bus 360.

The display 338 may include, for example, an interactive LED/LCD module positioned in a suitable location such as within or attached to the broadband residential gateway 300. The display 338 may include an interface to notify, display and receive user inputs and processing status. The display 338 may be configured to display various informational status such as multimedia mail, called ID, call logs, call in progress and associated information, call on hold, call on monitor hold, call waiting information, call conferencing, and/or other call-related information. The display 338 may provide a display of real time status of the various devices connected to the broadband residential gateway 300 as well as any current connections, calls, calls on hold and/or data transfers. The display 338 may also include touch screen capabilities that allow information to be input via a plurality of interrelated on-screen prompts, on-screen icons, and/or a keypad (e.g., an alphanumeric keyboard). The keypad may be a remote control, numeric keyboard, and/or alphanumeric keyboard.

In one embodiment of the display 338 operation, a user may touch an icon representing a pending voicemail and/or multimedia mail message. The panel may be configured to send an electronic signal to the processing controller 306 and/or an attached processor such as the telephony processor. On receiving the signal, the P1 telephony processor 308 may be configured to generate an IP packet via the transceiver 302 across portions of the broadband communication system 100 to the multimedia server 222 in IP central station 200. The multimedia server 222 may authenticate the request by, for example, verifying the location of the request and/or the identity of the requesting party. Where identity of the calling party is being verified, the user enters an access password by an audio and/or keyboard request. Where an audio request is generated, the user may utilize the external/internal intercom module 344 of the broadband residential gateway 300, or via a text message entered into the display 338. The user may then enter the appropriate access code via the onscreen soft keypad, microphone, and/or keyboard. Alternatively, the message could be stored locally in the broadband residential gateways 300 memory 322 and, depending on whether there is a password lock on the broadband residential gateway 300, the user may not have to enter a password to access the message. Where the message is stored locally in the broadband residential gateways 300 memory 322 rather than IP central station, the display 338 simply recalls the message from memory and presents it to the user to provide one-touch instant message retrieval.

The memory 322 may be variously configured to include one or more field-upgradeable card slots for permitting memory expansion. Certain users may wish to enable higher end applications such as near video on demand (e.g., pausing of shows via buffering in memory), video conferencing of multiple users, multi-party conferences, call waiting for multiple parties, etc. Accordingly, the use of a broadband residential gateway 300 allows the user to upgrade memory via inserting additional cards. Alternatively, the user may use system memory in IP central and buffer data remotely.

Operating program store 330 may be configured to receive updates. This may be accomplished by having the user replace one or more memory cards or automatically by the IP central station downloading new operating code into one or more residential gateways 300.

As previously indicated, smart buffer logic (SBL) may be coupled to the telephony port(s) 332, data port(s) 334, TV port(s) 336, peripheral port(s) 342, and/or the distributed processing controller (DPC) 306. Where the smart buffer logic is utilized, it may function to buffer the IP packets for delivery over the communication network such as the hybrid fiber-coaxial plant 112. In addition, the smart buffer logic may include selectable switching and routing algorithms based on services and applications associated with each port. Depending on the destination of the IP traffic, the smart buffer logic may multiplex signals from various devices to effect faster information transfer. The smart buffer logic may also allow direct memory access between memory 322 and one or more of the devices and/or ports coupled to the high speed bus 360.

The telephony port(s) 332 may include various interface circuitry (e.g., analog interface, logic and firmware) for interfacing with the Plain Old Telephone (POTs) telephones. Also the telephony port(s) 332 may be configured to include user interface logic, voice processing logic, voice activity detector logic, voice CODECs, and DTMF (dual tone multifrequency) tone sensing logic. Echo cancellation and automatic gain control may also be utilized in the telephony port(s) 332 circuitry. In one embodiment, RJ-11 connectors for a plurality of lines (e.g., four) are provided for connection to one or more existing plain old telephone system 160 telephone units. However, the broadband residential gateway 300 may contain any number of telephone connection ports. In this manner, any number of existing user phones may be connected directly to the broadband residential gateway 300 without modification. Alternatively, the broadband residential gateway can be configured to support, in addition to or as alternative to, the plain old telephone system telephone units, ISDN telephones and/or other digital phones (e.g., IP telephones) using an appropriate interface.

The data port(s) 334 interface may be variously configured. In one configuration, the data ports include high speed data service connections to, for example, a personal computer (PC) using a LAN connection. For example, the data ports 334 may include an Ethernet 802.3 connection compatible with category 5 unshielded twisted pair (UTP) cable and a RJ-45 connector. The data port(s) 334 may include the necessary interface circuitry for coupling to remote computers.

The TV port(s) 336 may include an interface for conventional television, HDTV and/or CATV services. The TV port(s) 336 typically have one or more F-connectors used for coaxial cable connection to a TV set(s). The TV ports may be configured to connect to a set-top box (STB) via the F-connector or directly to a remote television. In embodiments where the set-top box is co-located with the television, the data supplied over the TV ports may be either analog and/or digital information. Where the set-top box is integrated into and/or comprises the broadband residential gateway 300, the TV ports may be analog or compatible with HDTV signals.

The broadband residential gateway 300 need not necessarily be limited to home use and is intended to also be utilized in business applications. In some configurations, the broadband residential gateway 300 may serve the same functions and operate as a private branch exchange (PBX).

C. Integrated Broadband IP Based Communication System

Figure 4:
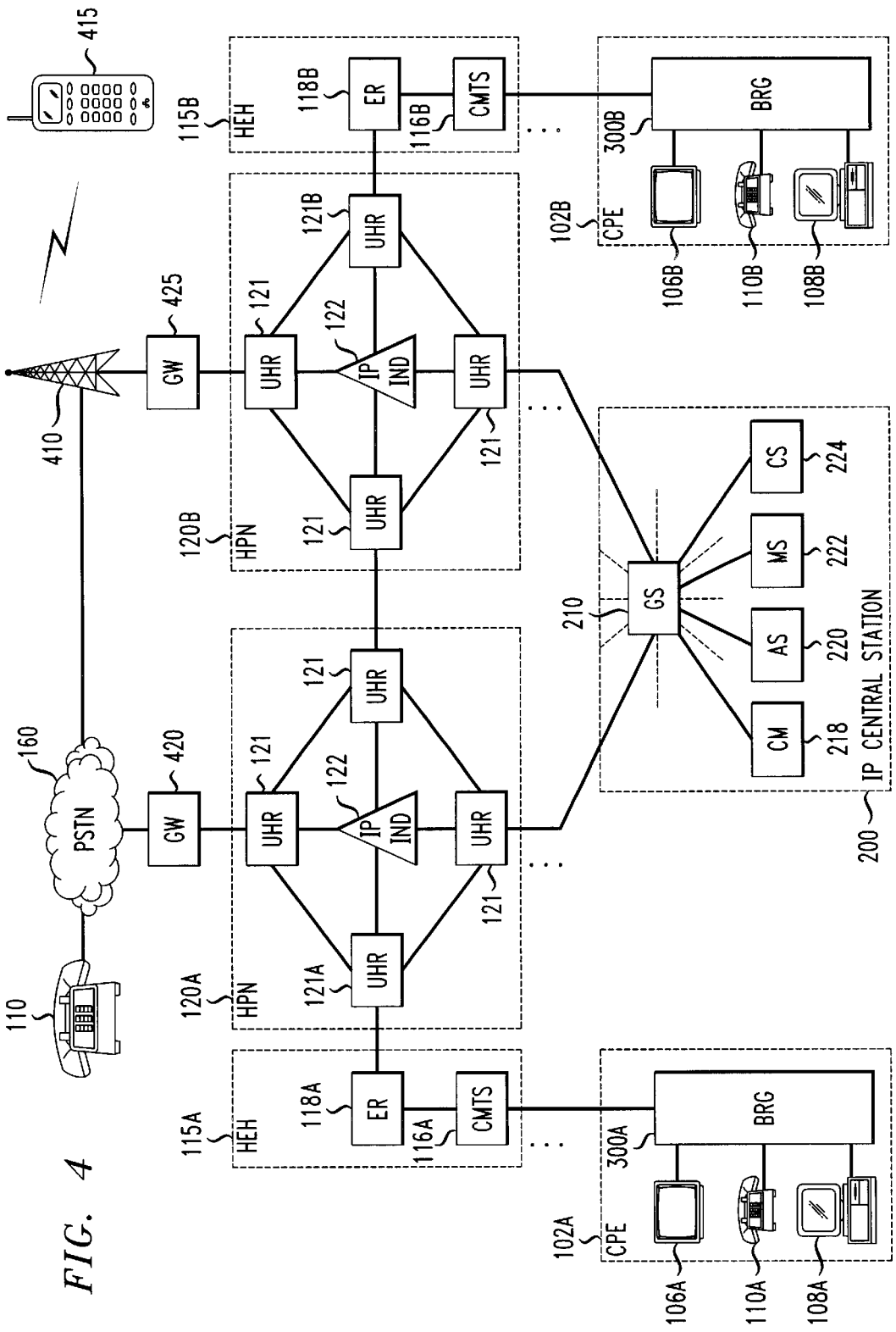
FIG. 4 shows a detailed schematic representation of an exemplary architecture in accordance with aspects of the present invention.

FIG. 4 shows an exemplary embodiment of a portion of the broadband communication system 100 shown in FIGS. 1–3, with like components identified with identical numbers. At the extremities of the integrated communications system is the customer premises equipment units (CPE) 102A and 102B, e.g., one or more customer premise equipment 102 at each customer location. The customer premise equipment 102A and 102B may be configured to include an integrated communication interface device such as the broadband residential gateway 300A and 300B, respectively. Other customer premise equipment 102A and 102B devices, such as one or more televisions (TV) 106A and 106B, personal computers (PC) 108A and 108B, and telephones 110A and 110B, etc., may be connected to the broadband residential gateway 300 via various ports as discussed above. The customer premise equipment 102A and 102B could include multiple TVs 106, telephones 110, and PCs 108 connected to a single and/or multiple broadband residential gateway 300. Further, in certain embodiments, it may be desirable to divide the broadband residential gateway 300 into more than one physical package. For example, certain interface circuitry may be located outside of the home while various processing circuitry may be located near a peripheral device such as in a set top.

Where the broadband residential gateway 300 is coupled to a head-end hub (HEH) 115A and 115B in accordance with a preferred embodiment of the present invention, it may be configured to provide the user with both information data (e.g., through an Ethernet interface), telephony access, and TV service (e.g., HDTV, Digital TV and/or CATV services). The head-end hubs 115A and 115B may provide an interconnection point to gather and/or transform external services (e.g., off air and satellite video, public switched telephone network voice, and Internet data) into a format suitable for distribution to the customer premise equipment 102. The head-end hubs 115A and 115B may include one or more cable modem termination systems (CMTS) 116A and 116B coupled between BRGs 300A and 300B and an edge router (ER) 118A and 118B, respectively. The edge routers 118A and 118B may be coupled to the cable modem termination system 116A and 116B and to one or more ultra high speed routers (UHR) 121A and 121B, respectively. One or more ultra high speed routers 121 may be interconnected to each other and/or through a centralized mechanism such as an IP network database to form router ring groups 120A and 120B to, in total, form a high speed packet network, for example, IP network 120. The high speed packet network is one example of the IP network 120 shown in FIG. 1. However, it is understood that the high speed packet network may be included within an Intranet, the Internet, or an ATM network.

As previously indicated, in the embodiment shown in FIG. 4, the high speed network 120n includes the ultra high-speed routers (UHR) 121 configured in a ring configuration. Although this embodiment shows the use of the IP network database (IND) 122, other configurations are also suitable. As further indicated above, the broadband communication system 100 may include a plurality of interconnected high performance networks 120n. Each high performance network 120n may include a separate IP central station 200 and/or share a single IP central station as illustrated. Having distributed IP central stations located throughout the broadband communication system 100 provides improved performance and quicker response time for an individual user. Although not illustrated, each high performance packet network 120, 120n may be connected to multiple head-end hubs 115; each head-end hub 115 may be connected to a plurality of customer premises equipment 102, each containing one or more broadband residential gateways 300. The transmission path between the CPE 102 and CMTS may include one or more hybrid fiber-coaxial plants 112. The plurality of high performance networks 120n may be configured as an interconnected network for routing packetized information from point-to-point in accordance with a desired destination.

The high performance network 120n may be configured to provide connectivity for and between a plurality of head-end hubs 115 and/or a plurality of broadband residential gateways 300 for end-to-end voice over IP applications. Further, the high performance network 120n may be configured to provide various communications between other networks such as the Internet, e.g., www 180, the public switched telephone network (PSTN) 160 and/or a wireless communications network including a mobile unit base station 410 and mobile communications device 415. The PSTN 160 may also be coupled to the wireless communications network including the mobile unit base station 410 and mobile communications device 415. The IP central station 200 may be configured to provide seamless integration and control of the high performance packet network 120 (e.g., an IP based communication system) interface with the public switched telephone networks (PSTN) 160 (which may be augmented by a signaling system seven (SS7)), and/or the Internet 180 so that packetized data, voice calls, multimedia calls, and other communication information is properly transferred between the broadband residential gateway 300 and other parts of the broadband communication network 100.

II. Managing Multiple Broadband Communications with Monitor Hold

One feature available in present circuit switched telephone systems such as a PSTN is call hold. The present invention provides a robust call hold feature/function for broadband communication networks, such as the one described in FIGS. 1–4 herein, by enabling a party placed on hold in a first communication session to enter a second communication session and continue to monitor the status of the first communication and/or introduce prompt messages to the activation and deactivation of the call hold feature. As a result, a broadband communication system user can use the present invention to more efficiently utilize his time and resources available with a broadband communications system. Although the present invention will be described using preferred embodiments with reference primarily to the broadband communication system shown in FIGS. 1–4, it is to be understood that the invention is not to be limited to the preferred embodiments but may be equally applied to other communication systems providing sufficient system capabilities to support the invention.

Figure 5:
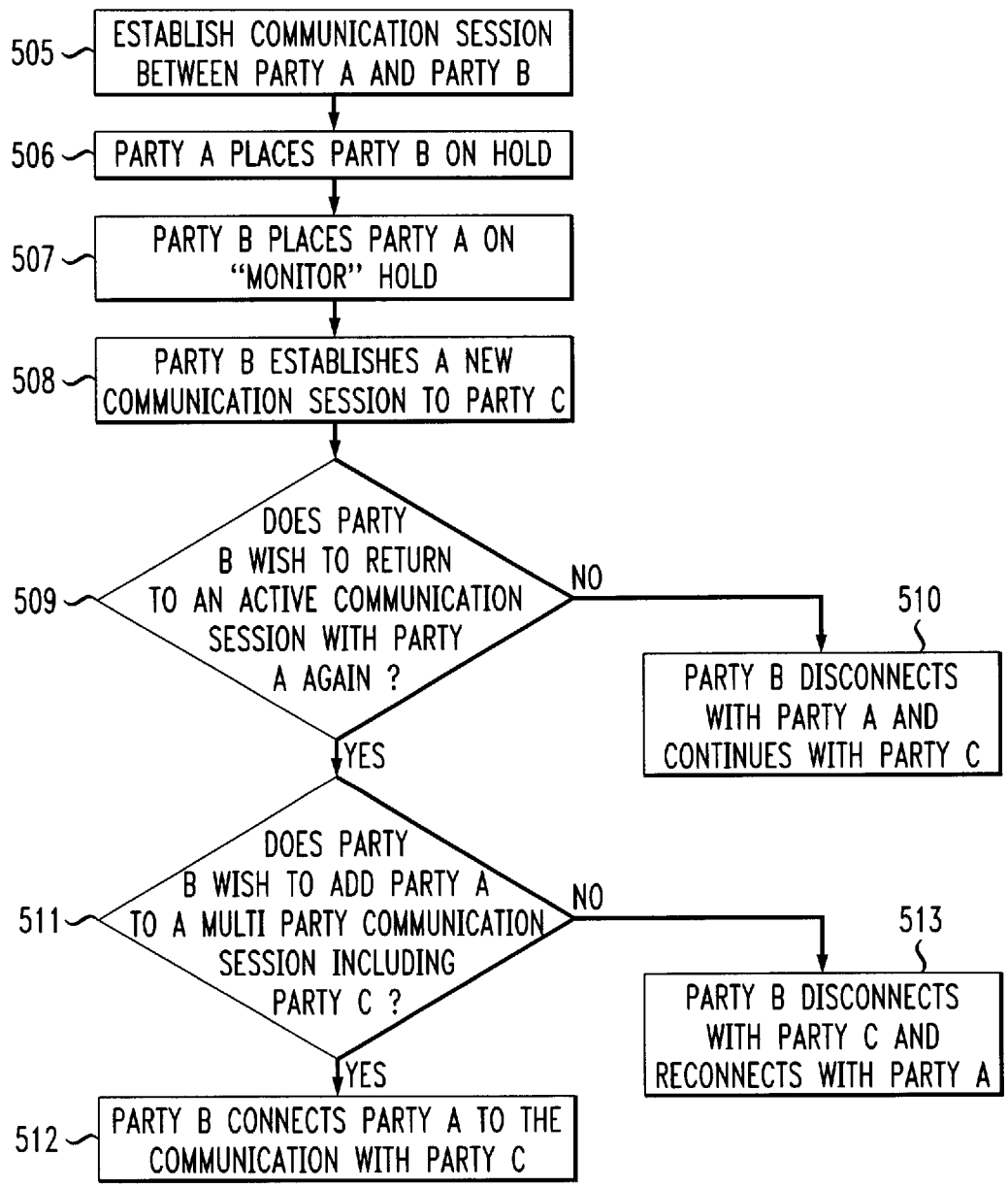
FIG. 5 is a process flow diagram illustrating one exemplary method of providing monitor on hold in accordance with the present invention.

Referring to FIGS. 4 and 5, in one preferred embodiment a broadband communication system user places a call on "monitor" hold while they are waiting on hold. First, at step 505, party A and party B enter into a communication session. For example, party A using telephone 110A calls party B at telephone 110B. Party A and party B thereby enter into a telephone conversation via the broadband communication system and their voice is packetized by their respective BRGs 300A and 300B. Their packetized voice is routed through the broadband communication network, for example IP network 120, with the assistance of, for example, the call manager 218. In another variation, the two parties may enter a multimedia communication session using PC 108A and PC 108B or their respective BRGs and TVs. In this case, routing assistance for routing the packetized communications may be provided by the multimedia server 222. In any case, packetized communication information is sent from party A to party B and party B to party A continuously based on their communication interactions.

Next, at step 506, one of the parties, e.g., party A, places another party, e.g., party B, on hold. Placing the call on hold may be initiated by a user using the switch hook (i.e., depressing and releasing the switch hook on the telephone), a keypad entry (e.g., entering a code via the telephone keypad such as #21), or DTMF entry. If the telephone has a call hold button, for example an ISDN telephone, the user may simply depress the hold button. Alternatively, a call hold could be initiated by a user selecting an icon on a display (e.g., PC 106, TV 108, BRG 300) via a touch screen, mouse, or keyboard entry. This manner is particularly useful in the case of a multimedia communication session. In any case, the call may be placed on hold using these means, or some combination of these means, to thereby activate the system to place the call on hold. For example, in response to party A's, request the BRG 300A and the BRG 300B would suspend the bi-directional transmission of packets related to the communication session. BRG 300B may still send communication session packets indicative of sounds made at party B's location to BRG 300A and BRG 300A may simply block those packets from being sent to the user interface device being used for another call by party A, such as the telephone 110A. In any case, suspension of packets may be coordinated by the CM 218 and/or the MS 222. Party B may receive alternative filler information packets, e.g., music or other entertainment, from party A's BRG 300A or from one of the servers within IP central station 200. In the case of a conference call, the conference server (CS) 224 may also be involved in coordination of the call hold. Further, party A may be connected with another incoming call (for which they had previously been notified) or may receive, for example, a dial tone indicative of party A's ability to enter another communication session. However, party B is left connected to party A's call placed on hold receiving filler information instead of having bi-directional communications with party A.

In one variation, party A may be a call center that queues incoming calls for one of a plurality of agents. In this case, the BRG 300A would immediately and automatically place the incoming call on hold, without the intervention of a physical person and party B would receive filler information from the call center. When a call center agent at party A answers the phone, the communication session with party B would be taken off hold.

In any case, party B may decide that he/she would like to make a second call while waiting for party A to return and take the call off hold. Alternatively, party B might decide he/she does not wish to receive the filler information while waiting on hold for party A to return. So, at step 507, party B may place the call with party A on "monitor" hold. While the communication is on monitor hold, party B is able to monitor the on hold communication session with party A to determine when party A returns. For example, the monitored call on hold may be maintained at a reduced volume (i.e., background), a video display of the video in a multimedia communication session may be displayed in a reduced window size on a display, or some combination of video and audio modification for the communication session on monitor hold may be used so that party B may enter another communication session using the same communication device while monitoring the call with party A to determine when party A has returned. The video and audio modification may be system controlled and/or user controlled. The system may, depending on user selection, provide party B a dial tone to make another call while monitoring the first call with party A. Thus, at step 508, party B can establishes a new communication session with party C. In one variation of the invention, party B could place party A on monitor hold in response to another incoming call for caller B (e.g., when party B has call waiting).

Similar to placing a call on hold, placing a call on monitor hold may be initiated by a using the switch hook (i.e., depressing and releasing the switch hook on the telephone), a keypad entry (e.g., entering a code via the telephone keypad such as #21), or DTMF entry. However, a mechanism may be included so that the system can distinguish between a monitor hold and a regular hold (without monitoring). This may be accomplished in a number of ways. For example, the CM 218 or party B's BRG 300B could maintain the information that party A has put the call with party B on hold, and that information could be used by the system as an indication to activate a monitor hold, rather than a regular hold, when party B does a switch hook. Otherwise, the monitor hold feature may be initiated by party B depressing the switch hook followed by entering a feature function code such as *55, or just entering the code *55 on the keypad. Further, if the telephone has a monitor hold button, for example an ISDN telephone, the user may simply depress the monitor hold button. Alternatively, a monitor hold could be initiated by party B selecting an icon on a display (e.g., PC 106, TV 108, BRG 300) via a touch screen, mouse, or keyboard entry. In any case, a monitor hold may be activated using these means, or some combination of these means, to thereby instruct the system to place the call on monitor hold.

In operation, when party B requests a monitor hold, the BRG 300A and the BRG 300B may suspend transmission of packets from party B's BRG 300B to party A's BRG 300B. In addition, the system, for example BRG 300A, BRG 300B, the CM 218 and/or the MS 222, may suspend transmission of the filler information and set up empty communication packets between BRG 300A and BRG 300B. In this way, the monitored communication would remain silent until party A takes the call off hold and resumes communication. In this case, when party B resumes the communication session, BRG 300A would begin transmitting packets including communication information from party A which would be combined with communication packets being sent by party C, and the combined communications would be presented to party B via BRG 300B. For example, if party A and party B originally were involved in a telephone call with one another, party A placed party B on hold, and party B placed the telephone call with party A on monitor hold, then party B would be able to enter a telephone call with party C and hear no sounds from the call with party A until party A takes the call off hold. At that point, party B would hear both sounds (e.g., voice) originating from party C and sounds (e.g., voice) originating from party A, preferably at different volumes so as to distinguish the two parties. The CM 218, MS 222, CS 224 or BRG 300B may be constructed to combine the communications from party A and party C. Thus, party B could hear party A's voice within his conversation with party C and decide whether to continue with the call with party A. Alternatively, the BRG 300B could also play a short tone to party B indicating that party A has taken the call off hold.

Next, at decision step 509, party B determines whether he/she wishes to return to an active communication session with party A (regardless of party A taking the call off hold). If so, at step 511, party B may respond by depressing the hook switch, entering a code, etc., in a manner similar to initiating a hold or monitor hold and the system will disconnect party B from the call with party C and reconnect party A with party B as indicated at step 513. As such, BRG 300A and BRG 300B will again begin an active communication session by providing bi-direction packetized communication information packets to one another and supplying that information to the user interface device presently being used by each respective party, party A and party B, e.g., telephones 110A and 110B. Alternatively, if at step 511, party B indicates by, for example, pressing a conference call button or entering a code to create a conference call, then the system, e.g., conference server 224, will connect party A with the call including party B and party C as illustrated at step 512. Alternatively, party B could put party C on hold and then connect to party A.

However, if party A has taken the call off hold and B does not wish to return to an active communication session with party A, then party B need not do anything and the system, e.g., CM 218, may be set up with an automatic timeout which will disconnect the call which party B placed on monitor hold if party B does not respond within a set period of time, for example 60 seconds, after party A takes the call off hold. Alternatively, party B could enter a terminate call code into the system. In either case, at step 510, the system would disconnect party A from party B and continue the connection with party C.

In one variation of the invention, party B might decide prior to entering into a call with party C that they do not wish to remain on hold with party A and will not respond to party A when party A takes the call off hold. In this case, party B may initiate the monitor hold feature and enter an additional input to record a personalized message which will be played to party A when party A takes the call off hold. This message may be saved in, for example, the BRG 300B or the AS 220.

Further, the present invention may provide prompts to various parties of a communication session when one or more parties to the communication session are placed on hold or taken off hold. For example, the broadband communication system may generate a prompt to one or more parties when a communication session is placed on hold or monitor hold, or when a communication session on hold or monitor hold is taken off hold. The prompts may be generated by one or more of the broadband communication servers, such as the CM 218, AS 220, MS 222, and the CS 224, or by one of the BRGs 300. One manner of providing the present invention including prompts is illustrated in FIG. 6.

Figure 6:
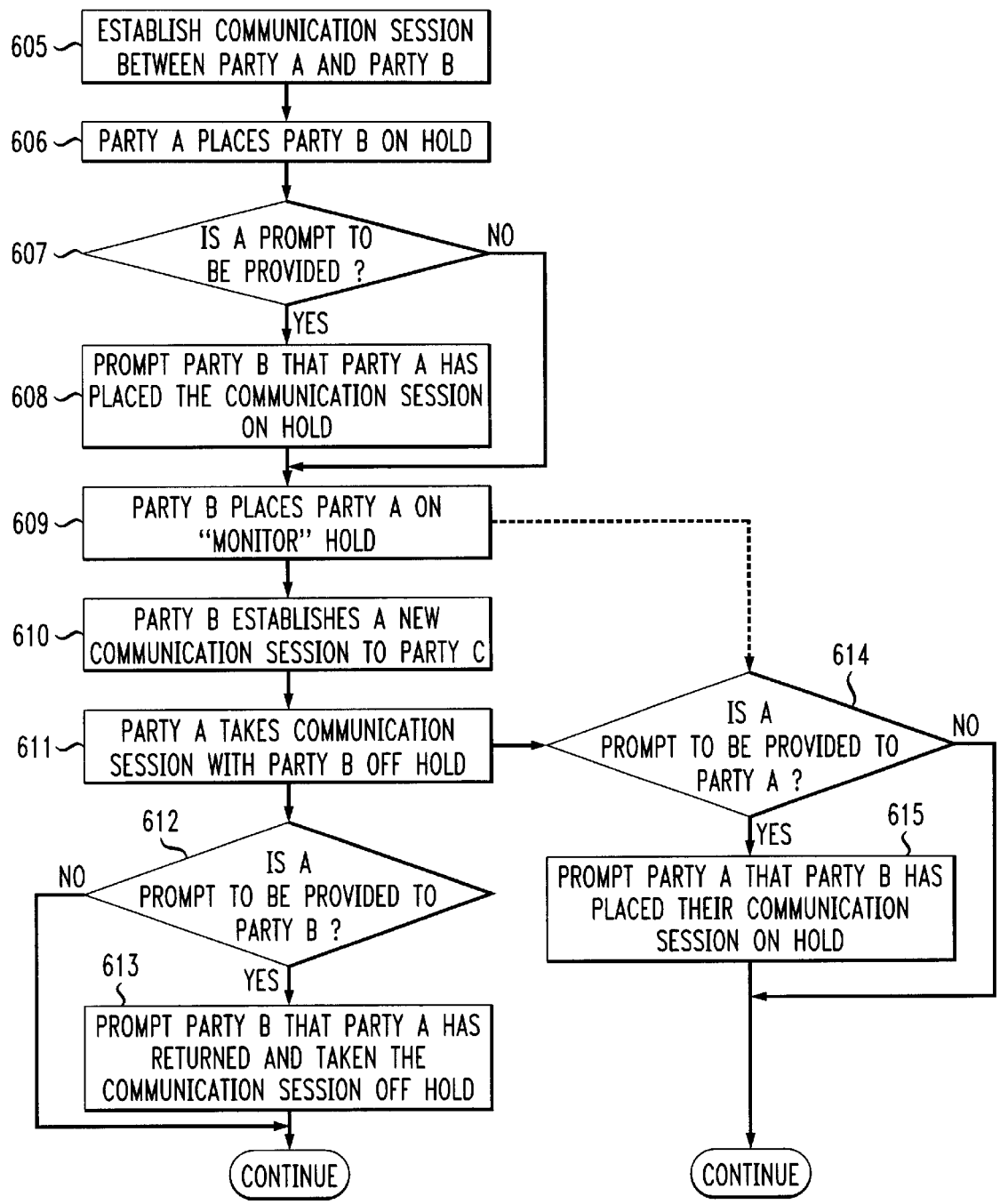
FIG. 6 is a process flow diagram illustrating one exemplary method of providing prompts to parties to a communication session when the session is placed on hold or take off hold in accordance with the present invention.

Referring to FIG. 6, at step 605, party A using CPE 102A enters a communication session with party B using CPE 102B. For example, party A picks up telephone 110A and calls party B who answers the call with telephone 110B. Next, at step 606, party A places party B on hold (e.g., regular hold). Then, at decision step 607, the system, for example the call manager (CM) 218, the announcement server (AS) 220 or a BRG 300, determines whether a prompt is to be provided. If so, then at step 608, the system may prompt party B that party A has placed the communication session on hold. This prompt may be in audio, video, text, or multimedia format and may include an audible ring. The prompt may be automatically generated by the system in response to party A placing the call on hold or may be activated manually in real time by party A. For example, if party A and party B are involved in a telephone call, then the system may automatically play an audio prompt such as "Your call with party A has been placed on hold" to party B when party A initiates the call hold feature, indicating that the party A has placed the call on hold. If no prompt is to be provided, then the system awaits further action by party A or party B. For example, party B may decide to place the communication session on monitor hold.

Next, at step 609, party B places party A on monitor hold. Once again the system may provide a prompt, for example, the AS 220, CM 218, and/or BRG 300 may provide a prompt to party A indicating that party B has placed their communication on monitor hold, e.g., "Party B has placed your call on monitor hold." This prompt may be in audio, video, text, or multimedia format. The prompt may even be provided to party A combined with incoming information of another communication session between party A and a third party, for example at a reduced volume in the background. Alternatively, the prompt may be presented as text on a display included in party A's CPE 102A. Once again, the prompt may be pre-programmed into the system to automatically be generated or may be activated in real time by party B, for example, entering a feature code into the system or typing or speaking the message into the system.

Then, at step 610, party B may establish a new communication session with party C, as described above. Next, at step 611, party A takes the communication with party B off hold. In one variation, Party A's BRG 300A will sense that the call with party A is taken off hold and send a message to, for example, the CM 118, which may determine what, if any, prompts are to be provided to which parties. So in response to a party taking a call off hold, the broadband communication system may provide a number of prompts to particular parties. For example, the system, for example the CM 218, may determine if a prompt is to be provided to party B at step 612. If so, the system, for example the CM 218, may instruct the AS 220 or a BRG 300 to generate a prompt and transmit it to party B indicating that party A has returned and taken their communication session off hold, as indicated at step 613. This prompt may be a user specific prompt or a general system prompt. One exemplary prompt may be "Party A is resuming your call. If you would like to resume your call, please depress the switch hook within 60 seconds." The wait delay time may be pre-programmed in the system or may be entered by party B in real time.

Further, the system may determine if a prompt is to be provided to party A at step 614. If so, the system, for example the AS 220 or a BRG 300, will generate a prompt to party A indicating that party B has put their communication session on monitor hold, as indicated at step 615. Once again, this prompt may be a user specific prompt or a general system prompt. This prompt may explain that it will be a moment before party B picks up the call and may include an indication as to how long the wait might be as entered in real time by party B pressing digits on the keypad. One exemplary prompt may be "Party B is presently on another call but is monitoring your call awaiting your return. Please hold, party B will be with you in 2 minutes."

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

In one variation of the invention, a system user may activate the monitor hold feature simply to eliminate music or advertisements being transmitted by a party who placed the call on hold. So party B, after being placed on hold by party A, may place the call on monitor hold and not enter into another communication session. As a result, party B will eliminate any filler information being transmitted by the system for party A's line.

In another variation of the invention, the commands for initiating the features of the present invention may be entered by voice command using the various voice recognition modules found in the system including voice recognition and voice synthesis module 355 found in the BRG 300 and a voice recognition and voice synthesis module which may be included with the AS 220 or CM 218. These modules may also be used to convert various prompts from one format to another before the prompt is presented to the system user.

In a still further variation of the invention, a system user with a wireless mobile unit 415 may be connected with the broadband communication system via a wireless base station 410 and a gateway 425. The gateway 425 and the mobile unit 415 may be constructed to emulate the feature/functions of a BRG 300. In this way the mobile station user may also utilize the monitor hold feature of the present invention. This would also be true for the user of a POTS 110 connected to the broadband communication system via PSTN 160 and gateway 420.

The present invention may also be applicable to circuit switched telephone networks which include intelligence, for example, an advanced intelligent network (AIN) and/or integrated services digital network (ISDN). One such system is illustrated in U.S. Pat. No. 5,195,087 titled "Telephone System With Monitor On Hold Feature" issued to Bennett et al., which is hereby incorporated by reference for all purposes.

All publications, patents, and patent applications cited herein are hereby incorporated by reference in their entirety for all purposes.

What is claimed is:

1. A method for enhanced communications in a communication system, comprising the steps of:
   a first party placing a first communication session between said first party and a second party on hold;
   placing said first communication session on monitor hold so that said second party can monitor said first communication session for said first party to resume said first communication session;
   determining if said second party has instructed to take said first communication session off monitor hold and resume active bi-directional communications with said first party;
   establishing a second communication session between said second party and a third party; and
   determining if said second party has instructed to add said first party to said second communication session with said third party so as to create a conference call including at least said first party, said second party, and said third party.

2. A method according to claim 1, further comprising the step of:
   generating a prompt for said first party indicating that said first communication session has been placed on monitor hold.

3. A method according to claim 1, wherein said communication system is a broadband communication system.

4. A method according to claim 1, wherein said second party is using a wireless mobile communication unit.

5. A method according to claim 1, wherein said second party is using a POTS telephone connected to a PSTN.

6. A method according to claim 1, further comprising the step of:
   providing a silent channel to said second party while said first communication session remains on hold by said first party.

7. A method according to claim 1, wherein said communication session is a telephone call.

8. A method according to claim 1, wherein said communication session is a multimedia call.

9. A method according to claim 1, further comprising the step of:
   taking said first communication session off hold in response to input by said first party.

10. A method according to claim 9, further comprising the step of:
    prompting said first party a first time indicating that said first communication session has been placed on monitor hold.

11. A method according to claim 10, wherein said monitoring is provided by a reduced volume or display view.

12. A method according to claim 10, further comprising the step of:
    prompting said second party that said first party has taken said first communication session off hold.

13. A method according to claim 12, further comprising the step of:
    prompting said first party a second time indicating that said first communication session has been placed on monitor hold.

14. A method according to claim 1, further comprising the step of:
    determining if said second party has instructed to place said third party on hold and take said first communication session with said first party off monitor hold.

* * * * *